Patented Apr. 17, 1923.

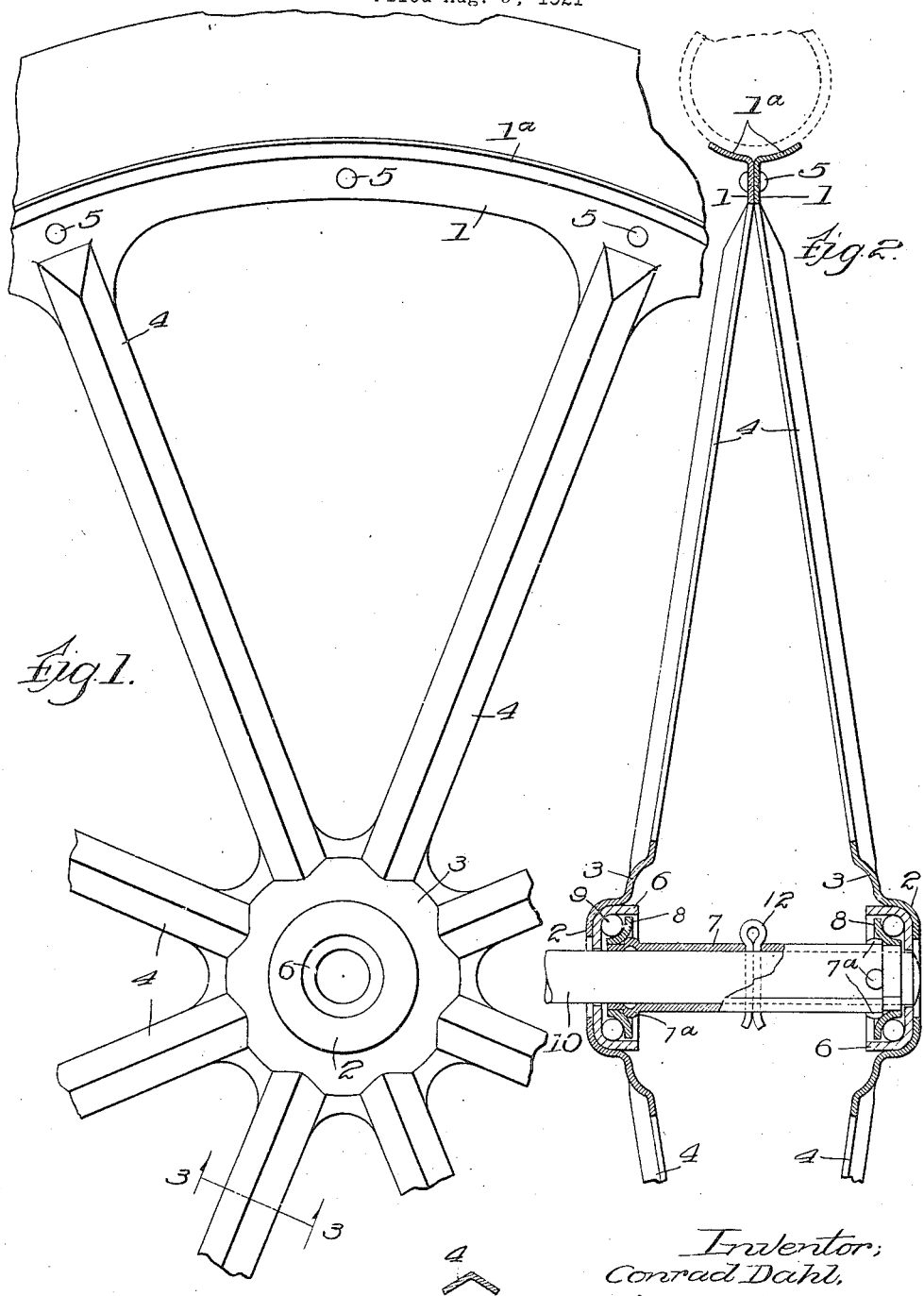

1,451,867

UNITED STATES PATENT OFFICE.

CONRAD DAHL, OF CHICAGO, ILLINOIS, ASSIGNOR TO DONALD M. CARTER, TRUSTEE, OF CHICAGO, ILLINOIS.

VEHICLE WHEEL.

Application filed August 3, 1921. Serial No. 439,432.

*To all whom it may concern:*

Be it known that I, CONRAD DAHL, a citizen of the United States, residing at Chicago, in the county of Cook and State of Illinois, have invented certain new and useful Improvements in Vehicle Wheels, of which the following is a specification, reference being had to the accompanying drawings, forming a part thereof.

The purpose of this invention is to provide a wheel construction of sheet metal stampings which may be cheaply constructed with accuracy having a high degree of rigidity relatively to its weight. It consists in the features and elements of construction shown and described, as indicated in the claims.

In the drawings:—

Figure 1 is a side elevation of a limited segment of a wheel embodying this invention.

Figure 2 is an axial section of the same.

Figure 3 is a detail section at the line, 3—3, on Figure 1.

The wheel comprises two identically formed webs which are sheet metal stampings, each consisting of an annular peripheral area, 1, which may have a small arcuate flange, 1ª, for seating a tire, and a central annular area which in each of the forms shown comprises a central boss, 2, and an annular tablet, 3, encompassing it less protruding than the boss, and radial spokes, 4, connecting the peripheral and central annular areas. The stamping is in general dished so as to cause the spokes, 4, to diverge from the plane of the peripheral annular area, 1, at a relatively small angle. When the two web members are assembled with their two annular areas, 1, lodged against each other and their central annular bosses facing each other, by reason of the divergence of the spokes from the peripheral annular areas 1, said central areas are definitely spaced apart and situated symmetrically with respect to the plane of said peripheral annular areas, at which the two members are secured together by rivets, 5, preferably one at the end of each spoke, and one half way between each two consecutive spokes. The spokes are preferably stiffened by being transversely dished, most preferably in wide V-shape as seen in Figure 3, the cavities of said dished or V-shaped spokes opening inward, facing each other.

Each central annular boss, 2, is designed to receive and hold securely with pressed fit, an inwardly-facing ball-race member, 6. Encompassing this boss, 2, as stated, there is an annular tablet, 3, formed in the stamping less protruding than the boss, 2; and the apex or crown of the hollowed or dished spokes is flush with the outer surface of this tablet, 3, the cavity of the tablet merging in the cavity of the spokes. This construction, interposing the tablet, 3, between the hollow V-shaped or dished spokes and the more protruding boss, 2, makes it possible to produce the stamping as shown with the maximum rigidity and strength at the junction of the spokes with the central area comprising the tablet, 3, and the ball-bearing-containing boss, 2; and by this means I am able to obtain a wheel exceedingly stiff and strong in proportion to its weight, the metal being in no respect weakened at any point in the stamping process. The wheel comprising the two assembled dished web members is constructed with a non-rotating axle within it, which,—not being strictly a part of the wheel,—that is, not part of the rotating element,—nevertheless serves as a strut, two web members spaced apart at the center and converging toward the periphery as described. This axle member consists of a tube, 7, on whose opposite ends there are mounted identical ball-race members, 8,— counterparts to the ball-race members, 6, which are in pressed-in engagement with the bosses, 2, of the wheel. The length of the tube, 7, and consequent spacing apart of the two ball-bearing members, 8, thereon, is such relatively to the spacing apart of the outer ball-race members, 6, as they are positioned by their pressed-in engagement in the bosses, 2, so as to accommodate the bearing balls between said counterpart members at the two ends, as seen in Figure 2, without pressure upon the balls or lost motion in the bearings. That is to say, the structure comprising the two dished stampings assembled together as described, is not to be spread apart at the center by the interposed axle member with ball bearings, but, on the contrary, is accurately dimensioned by the process of construction with respect to the axle with its ball race members and with respect to the balls of the same in the ball races, so that when assembled by lodging one end of the axle member with its outwardly-facing ball-race member, in the counterpart ball-bearing member of one of the webs with the balls between, and similarly applying the other stamping over the opposite end of the tubular axle member with the bearing balls between the two counterpart ball race members, the peripheral annular areas, 1, 1, of the two webs will be found lodged upon each other, ready to be secured together by the rivets, without any springing or straining of either of the stampings, and therefore without either applying pressure to the balls in their bearings, or spreading apart the ball-race members so as to leave the balls loose.

As a matter of detail in construction, for the purpose of insuring accuracy in the spacing apart of the ball-race members, 8, 8, on the tube, 7, that tube is made of a piece of flat metal in which there are first struck up the bosses, 7ª, in two rows, a short distance back from the opposite ends respectively so that when the blank is rolled up into tubular form, these bosses constitute two series of stops a short distance back from the opposite ends of the tube, and the tube in this form is then finished in a lathe or screw machine with a tool touching up the bosses, 7ª, at their outer sides to form a shoulder which may be formed by the side face of the boss, against which the ball-race member, 8, may be accurately stopped when it is forced onto the end of the tube as shown in the drawings. The axle comprising the tubular member described, is completed by means of a rigid axle rod or stud axle, 10, fixed within the tube and which is thrust through the tube after the wheel is assembled with the tube therein as described, and secured to the tube by any means, as the cotter pin, 12, so that the tube is held fixed thereon. This axle rod may be the usual stud axle of a vehicle such as a child's carriage, having a pair of wheels at opposite ends of such an axle, or on correspondingly situated oppositely positioned stud axles, in which case it will be seen that the axle rod may be terminated flush with the outer boss, 2, of the wheel, leaving nothing protruding for encounter in operating the vehicle. When the wheel is to be mounted in a fork, as in the case of a steering wheel of a bicycle or the like, the central axle rod will of course protrude at both ends for engagement with the fork arms.

I claim:—

1. A vehicle wheel comprising duplicate web members which are identically formed sheet metal stampings, having peripheral and central annular areas and radial spoke members connecting them which are transversely dished for stiffening the spokes, and deflected from the plane of the peripheral area, said stampings being lodged against each other and secured together at their said peripheral areas in relatively reverse position, whereby corresponding spokes of the two stampings diverge outwardly from the plane of said lodgment, and the central areas are definitely axially spaced apart, said central areas each comprising an externally projecting and an internally hollow boss, and a less protruding annular tablet encompassing the boss, the spokes at the apex of their dished form being formed flush with said annular tablet and their interior channels merging in the interior cavity of said tablet, the remainder of said hollow boss interior to the annular tablet being as to its inner surface uninterruptedly circular throughout.

2. A vehicle wheel comprising two web members which are dished metal stampings centrally apertured and having each an interior hollow boss about said central aperture, said stampings being secured together at their peripheries with their said dished sides and hollow bosses facing each other, whereby their central areas are spaced apart along the axis; exterior ball race members fixed in said hollow bosses respectively; and an axle member having rigidly mounted upon it interior ball race members, counterpart to and facing the exterior ball race members mounted in said bosses; said interior ball race members being spaced apart along the axis relatively to the spacing apart of said hollow bosses for accommodating between them and the exterior race members the balls seated in said races without binding pressure or lost motion.

3. In the construction defined in claim 2, foregoing, the axle comprising a sleeve on which are rigidly carried interior ball race members and an axle rod telescoped into said sleeve, said sleeve and rod having registering apertures intermediate the ends of the sleeve for disengageably pinning together the sleeve and rod intermediate the oppositely dished web members of the wheel.

In testimony whereof, I have hereunto set my hand at Chicago, Illinois, this 1st day of August, 1921.

CONRAD DAHL.